United States Patent
Nakano et al.

(10) Patent No.: US 10,115,385 B2
(45) Date of Patent: Oct. 30, 2018

(54) ULTRASONIC TRANSMISSION/RECEPTION UNIT, MANUFACTURING METHOD OF ULTRASONIC TRANSMISSION/RECEPTION UNIT, AND ULTRASONIC FLOW METER DEVICE

(75) Inventors: Makoto Nakano, Kyoto (JP); Hideaki Morihana, Nara (JP); Masato Satou, Nara (JP); Akihisa Adachi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 540 days.

(21) Appl. No.: 14/122,196

(22) PCT Filed: May 25, 2012

(86) PCT No.: PCT/JP2012/003424
§ 371 (c)(1),
(2), (4) Date: Nov. 25, 2013

(87) PCT Pub. No.: WO2012/164890
PCT Pub. Date: Dec. 6, 2012

(65) Prior Publication Data
US 2014/0086017 A1  Mar. 27, 2014

(30) Foreign Application Priority Data

May 27, 2011 (JP) ................................. 2011-119047

(51) Int. Cl.
*G01K 11/02* (2006.01)
*G10K 11/00* (2006.01)
*G01F 1/66* (2006.01)

(52) U.S. Cl.
CPC ............ *G10K 11/002* (2013.01); *G01F 1/662* (2013.01); *Y10T 29/49826* (2015.01)

(58) Field of Classification Search
CPC .............................. G10K 11/002; G01F 1/662
(Continued)

(56) References Cited

U.S. PATENT DOCUMENTS 6,508,133 B1 * 1/2003 Adachi ................... G01F 1/662
310/334
2008/0023197 A1   1/2008 Shurtleff
(Continued)

FOREIGN PATENT DOCUMENTS

CN        2511982 Y        9/2002
DE     102008055126    *   1/2010
(Continued)

OTHER PUBLICATIONS

English Machine translation of JP 2001-158551 (Published Jun. 12, 2001).*

(Continued)

*Primary Examiner* — Luke D Ratcliffe
(74) *Attorney, Agent, or Firm* — Brinks Gilson & Lione

(57) ABSTRACT

An ultrasonic transmission/reception unit includes a metal plate, an acoustic matching member, a piezoelectric substrate, a first lead wire, a second lead wire, and a vibration suppression member containing a thermoplastic resin as a major component, the vibration suppression member being configured to cover, in a unitary manner, the other main surface of the metal plate, which is other than a portion of the other main surface to which the piezoelectric substrate is fastened, a surface of the piezoelectric substrate, an end surface of the metal plate, an outer peripheral portion of the one main surface of the metal plate, the first lead wire, and the second lead wire.

8 Claims, 11 Drawing Sheets

(58) Field of Classification Search
USPC .......................................................... 367/140
See application file for complete search history.

(56) References Cited

U.S. PATENT DOCUMENTS

| | | | | |
|---|---|---|---|---|
| 2008/0232197 | A1* | 9/2008 | Kojima | G01S 7/521 367/99 |
| 2011/0314933 | A1* | 12/2011 | Mueller | B06B 1/0655 73/861.18 |

FOREIGN PATENT DOCUMENTS

| | | |
|---|---|---|
| DE | 10 2008 055 126 A1 | 7/2010 |
| JP | 10-224895 A | 8/1998 |
| JP | 2001-159551 A | 6/2001 |
| JP | 3528726 B2 | 6/2001 |
| JP | 2004-349973 A | 12/2004 |
| JP | 4193582 B2 | 12/2004 |
| JP | 2006-090751 A | 4/2006 |
| JP | 4731145 B2 | 4/2006 |
| JP | 2007-208381 A | 8/2007 |
| WO | WO 97/21985 A1 | 6/1997 |

OTHER PUBLICATIONS

Extended European Search Report in corresponding European Application No. 12793435.4, dated Nov. 10, 2014, 6 pages.
Office Action and Search Report, and partial English language translation thereof, in corresponding Chinese Application No. 201280025731.0, dated Jun. 2, 2015, 12 pages.
International Search Report for International Application No. PCT/JP2012/003424, dated Aug. 21, 2012, 2 pages.

\* cited by examiner

ULTRASONIC TRANSMISSION/RECEPTION UNIT, MANUFACTURING METHOD OF ULTRASONIC TRANSMISSION/RECEPTION UNIT, AND ULTRASONIC FLOW METER DEVICE This application is a 371 application of PCT/JP2012/003424 having an international filing date of May 25, 2012, which claims priority to JP 2011-119047 filed May 27, 2011, the entire contents of which are incorporated herein by reference.

TECHNICAL FIELD

The present invention relates to an ultrasonic transmission/reception unit, a manufacturing method of the ultrasonic transmission/reception unit, and an ultrasonic flow meter device. In particular, the present invention relates to a vibration suppression (damping) structure of the ultrasonic transmission/reception unit.

BACKGROUND ART

As an ultrasonic transmission/reception unit used in a conventional ultrasonic flow meter device, there is known an ultrasonic transducer or an ultrasonic sensor in which a piezoelectric element is expanded and contracted to generate an ultrasonic pulse. In the ultrasonic transducer, for example, an acoustic matching layer is fastened to an outer wall surface of a case, and a piezoelectric substrate is fastened to an inner wall surface of the case. An opening of the case is closed by a sealing member, and a vibration suppression (damping) member covers a side wall portion of the case. An end portion (support portion) of the case is mounted via a vibration transmission suppression member (prior art example 1: e.g., see Patent Literature 1).

In the ultrasonic sensor, for example, a piezoelectric element is fastened to an acoustic matching layer, and a plastic case is fastened to the acoustic matching layer such that the case covers the piezoelectric element with a gap. An elastic resin such as a silicon resin is filled inside of the case to fill around the piezoelectric element (prior art example 2: e.g., see Patent Literature 2).

Patent Literature 1: Japanese-Laid Open Patent Application Publication No. 2001-159551
Patent Literature 2: Japanese-Laid Open Patent Application Publication No. Hei. 10-224895

SUMMARY OF THE INVENTION

Technical Problem

However, in the prior art example 1, it is necessary to mount the vibration suppression member and the vibration transmission suppression member to the case fastened with the acoustic matching layer and the piezoelectric substrate, which is burdensome. Therefore, the productivity is not high.

In addition, since the piezoelectric substrate is not directly in contact with the vibration suppression member, an undesired reverberation vibration generated in the piezoelectric substrate, the case, or the like after the ultrasonic pulse is generated is not reduced adequately. The undesired vibration affects an ultrasonic pulse received, and therefore, a signal cannot be attained with a high accuracy.

In prior art example 2, in a case where the ultrasonic sensor is used as a device such as the ultrasonic flow meter device, the case is directly attached to a fluid passage. In this structure, a vibration generated in the piezoelectric substrate or the like is transmitted to the fluid passage and interferes with the ultrasonic pulse propagating, which degrades an accuracy of the signal.

The present invention is directed to solving the above described problem, and an object of the present invention is to provide an ultrasonic transmission/reception unit, a manufacturing method of the ultrasonic transmission/reception unit, and an ultrasonic flow meter device, which enable high-accurate measurement in a measurement device attached with the ultrasonic transmission/reception unit and is higher in productivity than a prior art technique.

Solution to Problem

To solve the above mentioned problem, there is provided an ultrasonic transmission/reception unit comprising: a metal plate; an acoustic matching member fastened to one main surface of the metal plate; a piezoelectric substrate fastened to the other main surface of the metal plate such that the piezoelectric substrate corresponds to a portion of the metal plate to which the acoustic matching member is fastened; a first lead wire connected to an end portion of the piezoelectric substrate which is more distant from the metal plate, to supply a voltage applied to the piezoelectric substrate; a second lead wire connected to the metal plate, to supply the voltage applied to the piezoelectric substrate; and a vibration suppression member containing a thermoplastic resin as a major component, the vibration suppression member being configured to cover, in a unitary manner, the other main surface of the metal plate, which is other than a portion of the other main surface to which the piezoelectric substrate is fastened, a surface of the piezoelectric substrate, an end surface of the metal plate, an outer peripheral portion of the one main surface of the metal plate, the first lead wire, and the second lead wire.

Advantageous Effects of the Invention

The present invention has advantages that it becomes possible to provide an ultrasonic transmission/reception unit, a manufacturing method of the ultrasonic transmission/reception unit, and a flow meter device, which enable high-accurate measurement in a measurement device attached with the ultrasonic transmission/reception unit and is higher in productivity than in a prior art technique.

The above and further objects and features of the invention will more fully be apparent from the following detailed description with accompanying drawings.

DETAILED DESCRIPTION OF THE PREFERRED EMBODIMENT

Figure 1A:
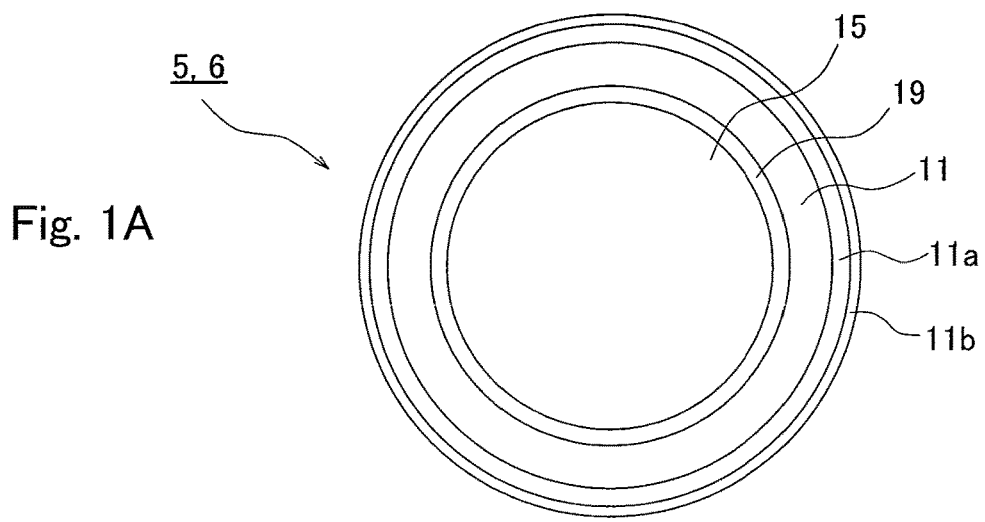
FIG. 1A is a plan view showing a front surface of an ultrasonic transmission/reception unit according to Embodiment 1 of the present invention.

According to a first aspect of the present invention, there is provided an ultrasonic transmission/reception unit comprising: a metal plate; an acoustic matching member fastened to one main surface of the metal plate; a piezoelectric substrate fastened to the other main surface of the metal plate such that the piezoelectric substrate corresponds to a portion of the metal plate to which the acoustic matching member is fastened; a first lead wire connected to an end portion of the piezoelectric substrate which is more distant from the metal plate, to supply a voltage applied to the piezoelectric substrate; a second lead wire connected to the metal plate, to supply the voltage applied to the piezoelectric substrate; and a vibration suppression member containing a thermoplastic resin as a major component, the vibration suppression member being configured to cover, in a unitary manner, the other main surface of the metal plate, which is other than a portion of the other main surface to which the piezoelectric substrate is fastened, a surface of the piezoelectric substrate, an end surface of the metal plate, an outer peripheral portion of the one main surface of the metal plate, the first lead wire, and the second lead wire.

In accordance with this configuration, since the vibration suppression member covers the piezoelectric substrate, it exhibits a vibration suppressing (damping) function for suppressing (damping) a vibration in the piezoelectric substrate, the metal plate, or the like. Because of this, it becomes possible to suppress an undesired reverberation vibration generated in the piezoelectric substrate, the metal plate, or the like after the ultrasonic pulse is generated. As a result, accuracy of flow measurement can be improved.

In a case where the ultrasonic transmission/reception unit is used in a measurement device such as an ultrasonic flow meter device, it is attached to the fluid passage via a portion of the vibration suppression member which covers the outer peripheral portion of the metal plate. Therefore, the vibration suppression member damps a vibration transmitted from the metal plate to the fluid passage and thus exhibits a vibration preventing function. By this vibration preventing function, an influence of the vibration on the ultrasonic pulse received can be suppressed, and high-accurate measurement can be implemented in the measurement device attached with the ultrasonic transmission/reception unit.

In addition, since the vibration suppression member contains the thermoplastic resin as a major component, the vibration suppression member can be formed unitarily using a resin mold. As a result, a high productivity of the ultrasonic transmission/reception unit can be attained.

According to a second aspect of the present invention, in the ultrasonic transmission/reception unit according to the first aspect, the metal plate may have a flat plate shape.

According to a third aspect of the present invention, in the ultrasonic transmission/reception unit according to the first aspect, the metal plate may have a flanged metal container shape, including a tubular peripheral portion, an end wall portion closing one end of the peripheral portion, and a flange portion formed at the other end of the peripheral wall portion; the acoustic matching member may be fastened to an outer surface of the end wall portion; the piezoelectric substrate may be fastened to an inner surface of the end wall portion such that the piezoelectric substrate is located in an inner space of the tubular peripheral wall portion; the second lead wire may be connected to the metal plate; and the vibration suppression member may be filled in the inner space of the tubular peripheral portion such that the vibration suppression member covers the surface of the piezoelectric substrate, the first lead wire and the second lead wire, and has a unitary structure to cover an inner surface of the flange portion, an outer peripheral surface of the flange portion, an outer surface of the flange portion, and an outer surface of the peripheral wall portion.

In accordance with this configuration, since the metal plate formed to have the flanged metal container shape has a higher dimension accuracy than a resin plate, high-accurate flow measurement can be implemented.

Furthermore, in addition to the vibration suppression member, the peripheral wall portion of the metal plate intervenes between the fluid passage and the piezoelectric substrate so as to damp a vibration in the piezoelectric substrate or the like. A bent portion from the end wall portion of the metal plate to the peripheral wall portion of the metal plate makes it possible to reduce an undesired vibration of the end wall portion after the ultrasonic pulse is generated. Because of these, it becomes possible to suppress a vibration from being transmitted from the ultrasonic transmission/reception unit to the fluid passage after the ultrasonic pulse is generated. As a result, accuracy of the flow measurement can be improved.

According to a fourth aspect of the present invention, in the ultrasonic transmission/reception unit according to any one of the first to third aspects, the piezoelectric substrate may have a groove extending in a thickness direction of the metal plate, and the vibration suppression member may be filled into the groove.

In accordance with this configuration, the groove filled with the vibration suppression member suppresses a vibration in a direction perpendicular to the thickness direction. Thus, a reverberation vibration transmitted to the fluid passage can be suppressed, and accuracy of the flow measurement can be improved.

According to a fifth aspect of the present invention, in the ultrasonic transmission/reception unit according to any one of the first to fourth aspects, the vibration suppression member may have a protruding portion protruding in a direction from a base end of the acoustic matching member toward a tip end of the acoustic matching member, in a portion covering the one main surface of the metal plate.

In accordance with this configuration, even when a stress or an impact is applied to the acoustic matching member during assembling, or the like, the vibration suppression member protects the acoustic matching member. Therefore, the ultrasonic transmission/reception unit can be easily assembled, and a high productivity of the ultrasonic transmission/reception unit can be attained.

According to a sixth aspect of the present invention, in the ultrasonic transmission/reception unit according to any one of the first to fifth aspects, the vibration suppression member may have a gap between the vibration suppression member and an outer peripheral surface of the acoustic matching member.

In accordance with this configuration, the gap serves to prevent the vibration suppression member from adhering to the acoustic matching member. Because of this, it becomes possible to prevent a characteristic change of the acoustic matching member, which would be caused by the vibration suppression member. As a result, high-accurate flow measurement can be implemented.

According to a seventh aspect of the present invention, there is provided a method of manufacturing an ultrasonic transmission/reception unit, comprising the steps of: creating an assembly structure including a metal plate, an acoustic matching member fastened to one main surface of the metal plate, a piezoelectric substrate fastened to the other main surface of the metal plate such that the piezoelectric substrate corresponds to a portion of the metal plate to which the acoustic matching member is fastened, a first lead wire connected to an end portion of the piezoelectric substrate which is more distant from the metal plate, to supply a voltage applied to the piezoelectric substrate, and a second lead wire connected to the metal plate, to supply the voltage applied to the piezoelectric substrate; and after accommodating the assembly structure into a die, forming a vibration suppression member made of a thermoplastic resin, by injecting the thermoplastic resin into the die such that the vibration suppression member covers, in a unitary manner, the other main surface of the metal plate, which is other than a portion of the other main surface to which the piezoelectric substrate is fastened, a surface of the piezoelectric substrate, an end surface of the metal plate, an outer peripheral portion of the one main surface of the metal plate, the first lead wire, and the second lead wire.

In accordance with this method, the ultrasonic transmission/reception unit having a vibration suppressing function and a vibration preventing function in the first aspect can be manufactured with a higher productivity than a prior art technique.

According to an eighth aspect of the present invention, in the method of manufacturing the ultrasonic transmission/reception unit according to the seventh aspect, in the step of forming the vibration suppression member, the assembly structure is accommodated into an inner space of the die such that the one main surface of the metal plate faces downward and a portion of the one main surface which is around the acoustic matching member is supported by an annular support portion of the die; and wherein the vibration suppression member is formed with a gap between the vibration suppression member and an outer peripheral surface of the acoustic matching member by injecting the thermoplastic resin into a region in the inner space of the die, which region is located outward relative to the annular support portion.

In accordance with this method, the ultrasonic transmission/reception unit which is capable of preventing the vibration suppression member from adhering to the acoustic matching member can be manufactured with a higher productivity than a prior art technique.

According to a ninth aspect of the present invention, there is provided an ultrasonic flow meter device comprising: a pair of ultrasonic transmission/reception units each of which is recited in any one of first to sixth aspects, the pair of ultrasonic transmission/reception units being configured to mutually transmit and receive an ultrasonic pulse; a fluid passage to which the pair of ultrasonic transmission/reception units are attached such that the pair of ultrasonic transmission/reception units are apart from each other; a propagation time measuring section for measuring time for which the ultrasonic pulse propagates between the pair of ultrasonic transmission/reception units; and a calculating section for calculating a flow of a measurement target fluid based on the time measured by the propagation time measuring section.

In accordance with this configuration, the same functions and advantages as those of the first to sixth aspects can be achieved.

Hereinafter, embodiments of the present invention will be described with reference to the drawings.

Hereinafter, throughout the drawings, the same or corresponding components are designated by the same reference numerals, and will not be described in repetition.

Embodiment 1

(Configuration of Ultrasonic Transmission/Reception Unit)

Figure 1B:
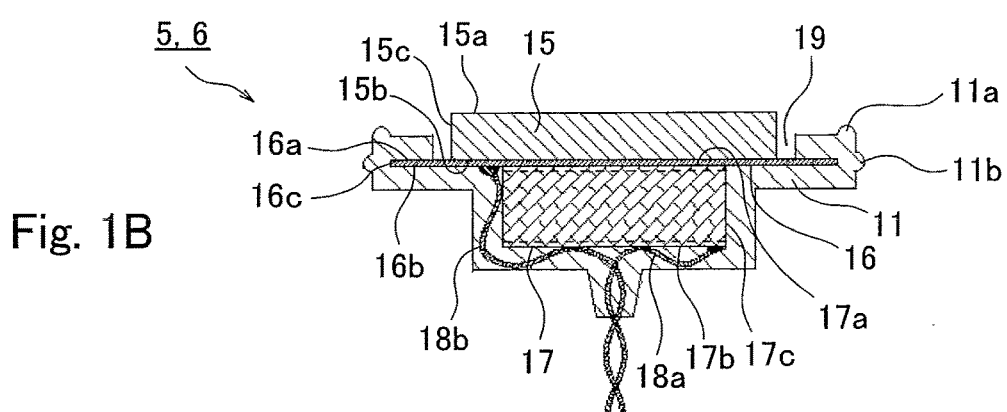
FIG. 1B is a cross-sectional view showing the ultrasonic transmission/reception unit of FIG. 1A.
Figure 1C:
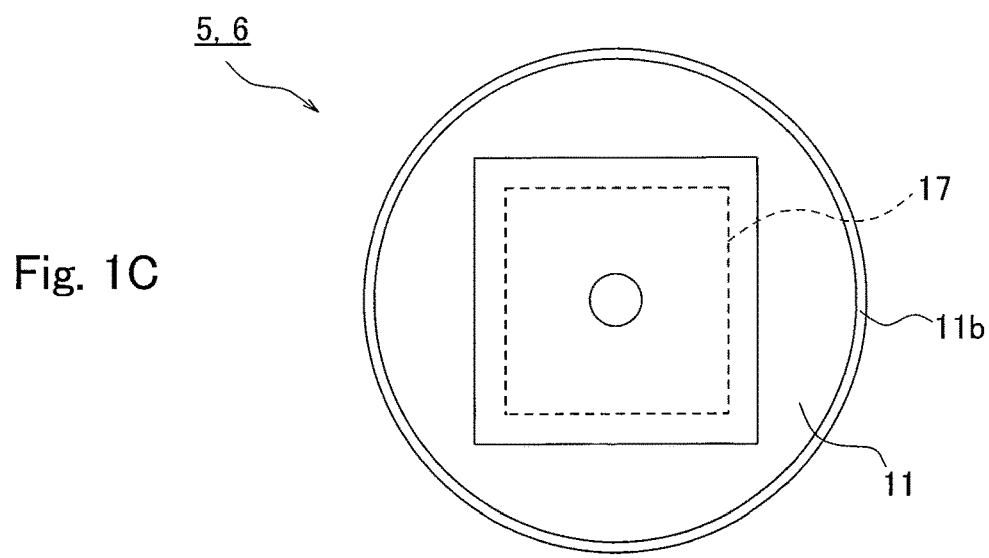
FIG. 1C is a plan view showing a rear surface of the ultrasonic transmission/reception unit of FIG. 1A.

FIG. 1A is a plan view showing a front surface of an ultrasonic transmission/reception unit 5, 6 according to Embodiment 1. FIG. 1B is a cross-sectional view showing the ultrasonic transmission/reception unit 5, 6. FIG. 1C is a plan view showing a rear surface of the ultrasonic transmission/reception unit 5, 6.

The ultrasonic transmission/reception unit 5, 6 includes a metal plate 16, an acoustic matching member 15, a piezoelectric substrate 17, a first lead wire 18a, a second lead wire 18b and a vibration suppression (damping) member 11.

The metal plate 16 is a flat disc plate supporting the acoustic matching member 15 and the piezoelectric substrate 17. A thickness of the metal plate 16 is set to have a desired stiffness. The desired stiffness makes it possible to support the acoustic matching member 15 and the piezoelectric substrate 17. The desired stiffness allows an ultrasonic pulse to be transmitted between the acoustic matching member 15 and the piezoelectric substrate 17 but a reverberation of the ultrasonic pulse to be suppressed.

The acoustic matching member 15 is fastened to a main surface 16a (one main surface) of the metal plate 16, while the piezoelectric substrate 17 is fastened to a main surface 16b (the other main surface) of the metal plate 16. An outer peripheral portion of the metal plate 16 protrudes from the acoustic matching member 15 and the piezoelectric substrate 17.

The metal plate 16 is made of an electrically conductive material, for example, metal such as iron, stainless, brass, copper, aluminum, nickel-plated steel plate, etc. The main surface 16b of the metal plate 16 is connected to an electrode 17a of the piezoelectric substrate 17 by ohmic contact using an adhesive agent. The main surface 16b of the metal plate 16 is also connected to the second lead wire 18b by solder, etc. This allows the electrode 17a of the piezoelectric substrate 17 to be electrically connected to the second lead wire 18b via the metal plate 16.

The acoustic matching member 15 is an element for matching an acoustic impedance of the piezoelectric substrate 17 with an acoustic impedance of a measurement target fluid to propagate an ultrasonic pulse generated in the piezoelectric substrate 17 to the measurement target fluid. For example, the acoustic matching member 15 has a cylindrical shape. The acoustic matching member 15 is bonded and fastened to the main surface 16a of the metal plate 16 by, for example, an adhesive agent.

As the acoustic matching member 15, used is a glass configured such that a thermoplastic resin is filled into hollow spherical spaces and cured, a ceramic porous member provided with an acoustic film on a sound wave radiation surface, etc. A thickness of the acoustic matching member 15 is set to, for example, a length of ¼ of a wavelength λ of the ultrasonic pulse.

The piezoelectric substrate 17 is an element which is expanded and contracted in response to a voltage applied thereto so that it converts an electric vibration into a mechanical vibration to generate the ultrasonic pulse. As the piezoelectric substrate 17, any material may be used so long as it exhibits a piezoelectric characteristic. In particular, barium titanate, lead zirconate titanate, etc., are suitably used.

The piezoelectric substrate 17 has a columnar shape such as a rectangular parallelepiped shape or a cylindrical shape. In the present embodiment, the piezoelectric substrate 17 has, for example, a rectangular parallelepiped shape of a short length. The piezoelectric substrate 17 includes the electrode 17a (one electrode), an electrode 17b (the other electrode) and a piezoelectric section 17c sandwiched between the electrode 17a and the electrode 17b in a thickness direction. This allows the piezoelectric substrate 17 to be expanded and contracted in a thickness direction of a portion of the metal plate 16 to which the acoustic matching member 15 is fastened. The electrode 17a of the piezoelectric substrate 17 is joined to the main surface 16b of the metal plate 16 by an electrically conductive paste or solder, so that the electrode 17a is electrically connected to the metal plate 16 and the piezoelectric substrate 17 is fastened to the metal plate 16. The electrode 17b of the piezoelectric substrate 17 is joined to the first lead wire 18a by an electrically conductive material such as solder or an electrically conductive paste.

The first lead wire 18a and the second lead wire 18b are electric wires connecting the electrodes of the piezoelectric substrate 17 to a propagation time measuring section (FIG. 3) or the like. As the lead wire 18a, 18b, a metal wire or a metal wire covered with a coating or plating insulator is used. The first lead wire 18a is connected to the electrode 17b of the piezoelectric substrate 17, while the second lead wire 18b is electrically connected to the electrode 17a of the piezoelectric substrate 17 via the metal plate 16.

The vibration suppression member 11 has a vibration preventing function for preventing a vibration generated when the ultrasonic pulse is propagating to the measurement target fluid, from being transmitted to the fluid passage 3. The vibration suppression member 11 also has a vibration suppressing (damping) function for quickly damping a vibration of the piezoelectric substrate 17 for generating the ultrasonic pulse and a vibration of the metal plate 16 generated by the vibration of the piezoelectric substrate 17. The vibration suppression member 11 covers in a unitary manner the main surface 16b of the metal plate 16 which is other than a portion of the main surface 16b of the metal plate 16 to which the piezoelectric substrate 17 is fastened, a surface of the piezoelectric substrate 17, an end surface 16c of the metal plate 16, an outer peripheral portion of the main surface 16a of the metal plate 16, the first lead wire 18a, and the second lead wire 18b. The unitary manner means that the vibration suppression member 11 is a single member made of a continuous material.

The vibration suppression member 11 covers the outer peripheral portion of the metal plate 16 such that there is a gap 19 of a predetermined width apart from an outer peripheral surface 15c of the acoustic matching member 15 on the main surface 16a of the metal plate 16. Since the vibration suppression member 11 is not provided on the acoustic matching member 15 in this way, it becomes possible to prevent a change in a characteristic of the acoustic matching member 15 which would be caused by the vibration suppression member 11.

The vibration suppression member 11 includes a first protrusion 11a and a second protrusion 11b. The first protrusion 11a protrudes from the main surface 16a side of the metal plate 16. The second protrusion 11b protrudes from the end surface 16c side of the metal plate 16.

The vibration suppression member 11 is formed of a thermoplastic resin having a low glass-transition point, for example, a thermoplastic elastomer material, a crystalline polyester, etc. As thermoplastic elastomer material, there are, for example, styrene elastomer, olefin elastomer, polyester elastomer, etc. As the crystalline polyester, there are, for example, an adhesive agent composition disclosed in Japanese Laid-Open Patent Application Publication No. 2006-57043, VYLOSHOT (registered trademark) GM-920, GM-913 manufactured by TOYOBO, Co., Ltd. etc. The glass-transition point of the thermoplastic resin is preferably equal to or lower than, for example, −30 degrees C. which is a lowest temperature in the flow measurement. This allows the vibration suppression member 11 to have a rubber elasticity and exhibit a vibration suppressing function during flow measurement. A melting point of the thermoplastic resin is preferably equal to or higher than 80 degrees C. which is a highest temperature in the flow measurement. A storage elastic modulus of the thermoplastic resin is, for example, 4 to 300 MPa in a range of the lowest temperature in the flow measurement to the highest temperature in the flow measurement. This enables the vibration suppression member 11 to well absorb a vibration generated in the metal plate 16 and the piezoelectric substrate 17 during the flow measurement.

The thermoplastic resin used in the vibration suppression member 11 has functional group which is easily adsorbed onto the material of the metal plate 16 and the material of the piezoelectric substrate 17. Because of this, by contact with the metal plate 16 and the piezoelectric substrate 17, the vibration suppression member 11 exhibits a vibration suppressing (damping) function for suppressing (damping) a vibration of the metal plate 16. The thermoplastic resin used for the vibration suppression member 11 is melted by heating and solidified by cooling. For this reason, as will be described later, the vibration suppression member 11 can be formed in a short time. Furthermore, the thermoplastic resin used for the vibration suppression member 11 has an electric insulativity. Because of this, the vibration suppression member 11 prevents electric discharge from the first lead wire 18a, the second lead wire 18b, the metal plate 16, or the like. The vibration suppression member 11 electrically insulates the electrode 17a of the piezoelectric substrate 17 from the electrode 17b of the piezoelectric substrate 17. Thus, even when foreign matters such as an electric conductor exists between the electrode 17a and the electrode 17b, the piezoelectric substrate 17 can operate stably.

[Manufacturing Method of Ultrasonic Transmission/Reception Unit]

Figure 2A:
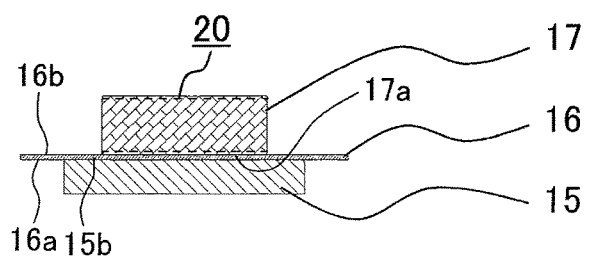
FIG. 2A is a cross-sectional view showing an assembly structure in which an acoustic matching member and a piezoelectric substrate are fastened to a metal plate in the ultrasonic transmission/reception unit of FIG. 1B.
Figure 2B:
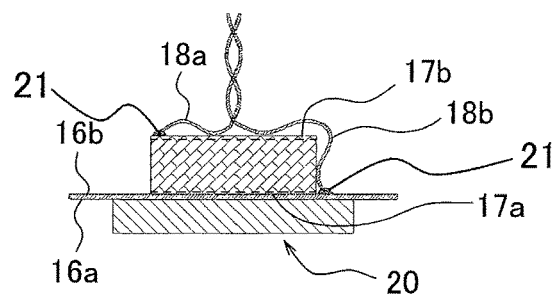
FIG. 2B is a cross-sectional view showing a state in which lead wires are connected to the assembly structure of FIG. 2A.
Figure 2C:
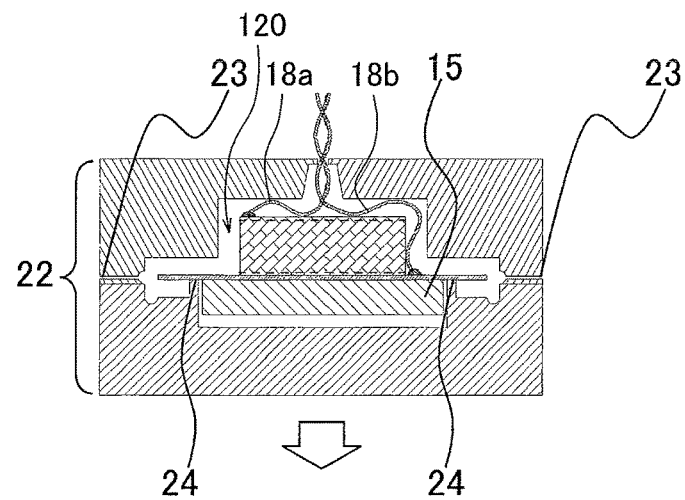
FIG. 2C is a cross-sectional view showing a state in which the assembly structure of FIG. 2B is accommodated into a die.
Figure 2D:
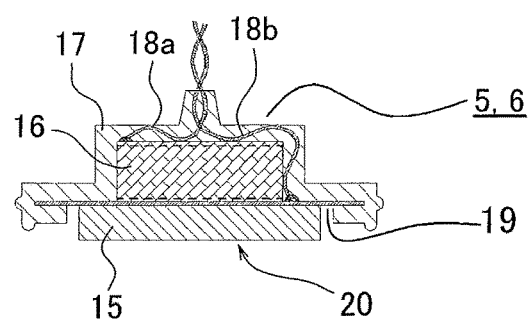
FIG. 2D is a cross-sectional view showing a state in which a vibration suppression member is mounted to the assembly structure of FIG. 2C.

FIG. 2A is a cross-sectional view showing an assembly structure 20 in which the acoustic matching member 15 and the piezoelectric substrate 17 are fastened to the metal plate 16 in the ultrasonic transmission/reception unit 5, 6. FIG. 2B is a cross-sectional view showing a state in which the lead wires 18a, 18b are connected to the assembly structure 20. FIG. 2C is a cross-sectional view showing a state in which the assembly structure 20 is accommodated into a die 22. FIG. 2D is a cross-sectional view showing a state in which the vibration suppression member 11 is mounted to the assembly structure 20.

As shown in FIG. 2A, the acoustic matching member 15 is fastened to the metal plate 16 in such a manner that the acoustic matching member 15 is bonded to the main surface 16a of the metal plate 16 by an adhesive agent. Also, the piezoelectric substrate 17 is fastened to the metal plate 16 in such a manner that the electrode 17a is bonded to the main surface 16b of the metal plate 16 by an electrically conductive paste or the like. Thereby, the electrode 17a of the piezoelectric substrate 17 is electrically connected to the metal plate 16. Thus, the assembly structure 20 in which the acoustic matching member 15 and the piezoelectric substrate 17 are joined to the metal plate 16, is formed.

As shown in FIG. 2B, in the assembly structure 20, the first lead wire 18a is joined to the electrode 17b of the piezoelectric substrate 17 by an electrically conductive member 21. Also, the second lead wire 18b is joined to the main surface 16b of the metal plate 16 by the electrically conductive member 21. Thus, the second lead wire 18b is electrically connected to the electrode 17a of the piezoelectric substrate 17 via the metal plate 16. Then, the first lead wire 18a and the second lead wire 18b are connected to the assembly structure 20. As a result, the assembly structure 20 (assembly) connected with the lead wires 18a, 18b is formed.

As shown in FIG. 2C, the assembly structure 20 (assembly) connected with the lead wires 18a, 18b is placed inside of the die 22. An interior of the die 22 has a shape which is substantially similar to that of the assembly structure 20 connected with the lead wires 18a, 18b. It should be noted that the die 22 has a support portion 24 corresponding to the gap 19 of the vibration suppression member 11. The support portion 24 has a cylindrical shape and protrudes toward the interior of the die 22. A diameter of an inner surface of the support portion 24 is set slightly greater than a diameter of the acoustic matching member 15. It is sufficient that the support portion 24 is annular. The die 22 is provided with an inlet 23 through which the thermoplastic resin used for the vibration suppression member 11 is filled into the die 22. The inlet 23 penetrates the die 22. In addition, the die 22 is provided with a recess corresponding to the first protrusion 11a and a recess corresponding to the second protrusion 11b.

The assembly structure 20 is accommodated into the die 22 in such a way that it is fitted into the interior of the cylindrical shape. At this time, the main surface 16a of the metal plate 16 faces downward, and is supported by the support portion 24. Then, the assembly structure 20 is positioned with respect to the die 22 so that an inner surface of the die 22 is substantially parallel to a surface of the assembly structure 20 and surfaces of the lead wires 18a, 18b with a specified spacing between them. A portion of the main surface 16a of the metal plate 16 is in contact with the support portion 24, while the main surface 16b of the metal plate 16 is in contact with a fastening portion (not shown) which is a portion of the die. This allows the assembly structure 20 to be fastened in such a way that it is sandwiched inside of the die.

The vibration suppression member 11 is molded in such a manner that the melted thermoplastic resin is flowed through the inlet 23 of the die 22 while applying heat of 180 degrees C. and a pressure of 5 to 16 MPa to the melted thermoplastic resin, for example. At this time, the thermoplastic resin is filled into a space between the assembly structure 20 and the lead wires 18a, 18b, and the inner surface of the die 22. At this time, the functional group of the thermoplastic resin is adsorbed onto a metal surface of the metal plate 16 and a surface of the piezoelectric substrate 17, and the thermoplastic resin adheres to these surfaces. Since the support portion 24 is in contact with the main surface 16a of the metal plate 16, the thermoplastic resin cannot enter the support portion 24 and inside thereof. Because of this, the thermoplastic resin does not adhere onto the surface 15a and the outer peripheral surface 15c of the acoustic matching member 15. Then, for example, when about 1 minute passes, the thermoplastic resin is cooled and solidified inside of the die, and in this way, the vibration suppression member 11 is formed.

As shown in FIG. 2D, the assembly structure 20 having the members is taken out of the die 22, and the ultrasonic transmission/reception unit 5, 6 is completed. In the vibration suppression member 11 of the ultrasonic transmission/reception unit 5, 6, the gap 19 corresponding to the support portion 24 is formed on the main surface 16a of the metal plate 16. Thereby, the vibration suppression member 11 is not formed on the acoustic matching member 15 which is located inward relative to the support portion 24, and the acoustic matching member 15 is exposed to outside. The vibration suppression member 11 covers the surface of the assembly structure 20 and the surfaces of the lead wires 18a, 18b, except for the gap 19 and the acoustic matching member 15.

[Configuration of Ultrasonic Flow Meter Device]

Figure 3:
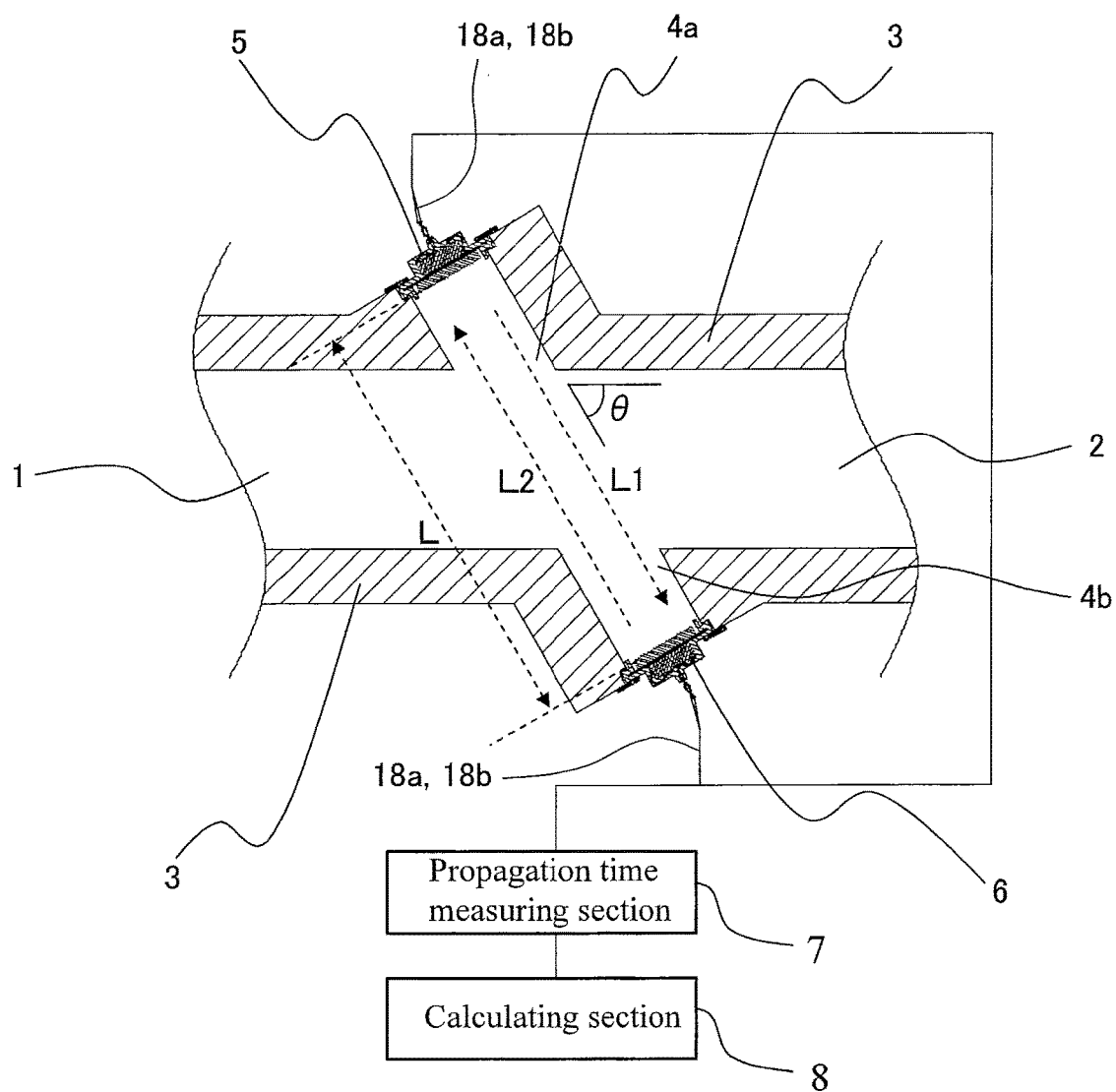
FIG. 3 is a cross-sectional view schematically showing an ultrasonic flow meter device attached with the ultrasonic transmission/reception units of FIG. 1B.
Figure 4:
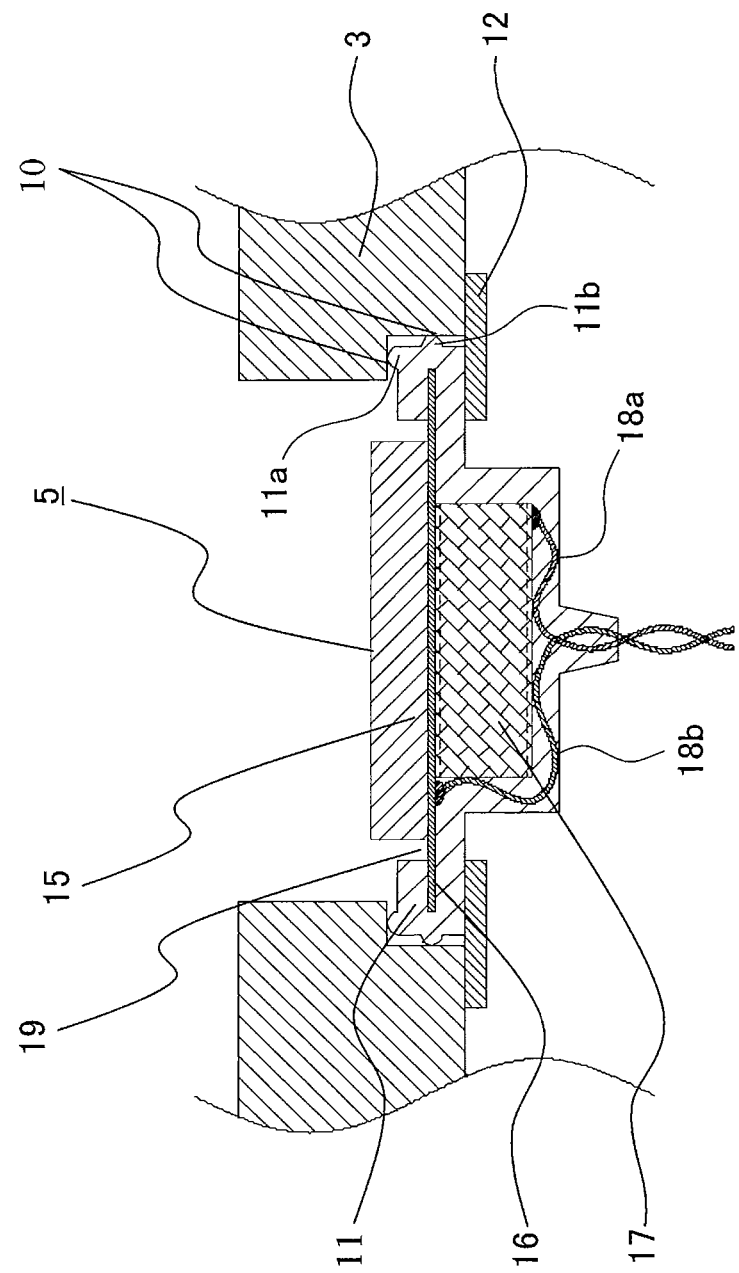
FIG. 4 is an enlarged cross-sectional view showing a portion of the ultrasonic transmission/reception unit attached to the ultrasonic flow meter device of FIG. 1B.

FIG. 3 is a cross-sectional view schematically showing an ultrasonic flow meter device attached with the ultrasonic transmission/reception units 5, 6. FIG. 4 is an enlarged cross-sectional view showing a portion of the ultrasonic transmission/reception unit 5, 6 attached to the ultrasonic flow meter device.

The ultrasonic flow meter device is a device for measuring a flow (rate) of a measurement target fluid flowing through the fluid passage 3. The ultrasonic flow meter device includes the fluid passage 3, the pair of ultrasonic transmission/reception units 5, 6, a propagation time measuring section 7 and a calculating section 8.

The fluid passage 3 is formed by, for example, a cylindrical pipe through which the measurement target fluid flows. The fluid passage 3 includes a first opening 1 provided at one end and a second opening 2 provided at the other end. In addition, the fluid passage 3 includes a first opening portion 4a and a second opening portion 4b facing the first opening portion 4a. The first opening portion 4a and the second opening portion 4b are each formed by a cylindrical recess protruding from an inner surface of the fluid passage 3 in a radially outward direction of the fluid passage 3. A center axis of the first opening portion 4a conforms to a center axis of the second opening portion 4b. The center axis of the first opening portion 4a and the center axis of the second opening portion 4b are inclined with an angle θ with respect to a center axis of the fluid passage 3.

The pair of ultrasonic transmission/reception units 5, 6 are in contact with and fastened to the fluid passage 3 in locations where they mutually transmit and receive an ultrasonic pulse. That is, one of the pair of ultrasonic transmission/reception units (hereinafter "first ultrasonic transmission/reception unit") 5 is mounted to the first opening portion 4a, while the other of the pair of ultrasonic transmission/reception units (hereinafter "second ultrasonic transmission/reception unit") 6 is mounted to the second opening portion 4b. At this time, the acoustic matching members 15 of the pair of ultrasonic transmission/reception units 5, 6 face each other. Each of the ultrasonic transmission/reception units 5, 6 emits the ultrasonic pulse in a direction which is parallel to the center axes of the opening portions 4a, 4b and inclined with the angle θ with respect to the center axis of the fluid passage 3. Each of the ultrasonic transmission/reception units 5, 6 receives the ultrasonic pulse which is incident in a direction which is parallel to the center axes of the opening portions 4a, 4b and inclined with the angle θ with respect to the center axis of the fluid passage 3.

As shown in FIG. 4, each of the ultrasonic transmission/reception units 5, 6 is configured such that the outer peripheral portion of the vibration suppression member 11 is fitted into the recess of the fluid passage 3 and the first protrusion 11a and the second protrusion 11b are in contact with a contact portion 10 of the fluid passage 3. A surface of the vibration suppression member 11 which is on the opposite side of the surface of the vibration suppression member 11 which is provided with the first protrusion 11a, is in contact with a fastening member. The fastening member 12 is placed on the vibration suppression member 11 so as to press the first protrusion 11a against the fluid passage 3, and fastened to the fluid passage 3. Because of this, the vibration suppression member 11 is supported at the first protrusion 11a, the second protrusion 11b, and the opposing surface of the first protrusion 11a, by the fluid passage 3 and the fastening member. Thereby, the ultrasonic transmission/reception units 5, 6 are placed in predetermined positions of the opening portions 4a, 4b, respectively.

As shown in FIG. 1, the propagation time measuring section 7 and the calculating section 8 are configured as a controller such as a microcomputer. The microcomputer includes a processing section such as a CPU and a storage section such as ROM and RAM. The propagation time measuring section 7 and the calculating section 8 may be configured as a single controller or separate controllers.

The propagation time measuring section 7 measures time for which the ultrasonic pulse propagates between the pair of ultrasonic transmission/reception units 5, 6. The calculating section 8 calculates a flow (rate) of the measurement target fluid based on the time measured by the propagation time measuring section 7.

(Operation of Ultrasonic Flow Meter Device)

As shown in FIG. 3, the propagation time measuring section 7 applies an electric (voltage) signal to the piezoelectric substrate 17 of each of the ultrasonic transmission/reception units 5, 6 via the lead wires 18a, 18b. This electric signal is formed as a square waveform with a frequency close to a resonance frequency of the piezoelectric substrate 17. This allows the piezoelectric substrate 17 to convert the electric signal into a mechanical vibration. By this mechanical vibration, as shown in FIG. 4, the piezoelectric substrate 17 and the acoustic matching member 15 resonate to generate a greater ultrasonic pulse.

As shown in FIG. 3, the ultrasonic pulse generated in the first ultrasonic transmission/reception unit 5 propagates through a propagation path L1 and is received in the second ultrasonic transmission/reception unit 6. Also, the ultrasonic pulse generated in the second ultrasonic transmission/reception unit 6 propagates through a propagation path L2 and is received in the first ultrasonic transmission/reception unit 5. Receiving the ultrasonic pulse, in the ultrasonic transmission/reception unit 5, 6, the piezoelectric substrate 17 converts the mechanical vibration of the ultrasonic pulse into the electric vibration and outputs the electric vibration to the propagation time measuring section 7. Therefore, the propagation time measuring section 7 finds propagation time t1 and propagation time t2 of the ultrasonic pulse based on a difference between time when the electric signal is output to the piezoelectric substrate 17 and time when the electric signal is input from the piezoelectric substrate 17.

Then, the calculating section 8 calculates the flow (rate) of the measurement target fluid based on the propagation time t1 and propagation time t2 of the ultrasonic pulse which are found by the propagation time measuring section 7. Specifically, in a case where the measurement target fluid flows from the first opening 1 toward the second opening 2 through the fluid passage 3 at a flow velocity V, the propagation time t1 and propagation time t2 of the ultrasonic pulse propagating at a speed C over a distance L of the propagation path L1 and the propagation path L2 are different from each other. It should be noted that the distance L of the propagation path L1 and the propagation path L2 of the ultrasonic pulse is a distance between the first ultrasonic transmission/reception unit 5 and the ultrasonic transmission/reception unit 6. The angle θ is an angle formed between a flow direction of the measurement target fluid and a propagation direction of the ultrasonic pulse.

The propagation time t1 of the ultrasonic pulse transmitted from the first ultrasonic transmission/reception unit 5 to the second ultrasonic transmission/reception unit 6 through the propagation path L1 is represented by:

$$t1 = L/(C + V \cos \theta) \quad (1)$$

The propagation time t2 of the ultrasonic pulse transmitted from the second ultrasonic transmission/reception unit 6 to the first ultrasonic transmission/reception unit 5 through the propagation path L2 is represented by:

$$t2 = L/(C - V \cos \theta) \quad (2)$$

According to the formulas (1) and (2), the flow velocity V of the measurement target fluid is represented by:

$$V = L/2 \cos\theta(1/t1 - 1/t2) \quad (3)$$

The distance L of the propagation path L1 and the propagation path L2 of the ultrasonic pulse, and the angle θ formed between the flow direction of the measurement target fluid and the propagation direction of the ultrasonic pulse, are known. The propagation time t1 and the propagation time t2 of the ultrasonic pulse are measured by the propagation time measuring section 7. Based on these, the calculating section 8 calculates the flow velocity V of the measurement target fluid. Then, the calculating section 8 calculates a flow Q by multiplying the flow velocity V by a cross-sectional area S of the fluid passage 3 and a compensation coefficient K.

(Function, Advantage)

In accordance with the configuration as described above, the vibration suppression member 11 covers the main surface 16b of the metal plate 16 which is other than a portion of the main surface 16b of the metal plate 16 to which the piezoelectric substrate 17 is fastened, the surface of the piezoelectric substrate 17, the end surface 16c of the metal plate 16, the outer peripheral portion of the main surface 16a of the metal plate 16, the first lead wire 18a, and the second lead wire 18b. This makes it possible to suppress a situation in which the piezoelectric substrate 17, the metal plate 16, or the like undesirably continue to vibrate, after the ultrasonic pulse is generated. Because of this, the ultrasonic transmission/reception unit 5, 6 can receive the ultrasonic pulse in a state in which a vibration in the piezoelectric substrate 17 and a vibration in the acoustic matching member 15 are damped, so that a signal of the received ultrasonic pulse can be attained with a high accuracy. Since the vibration of the piezoelectric substrate 17 or the like is damped, time that lapses until the ultrasonic pulse is generated next can be reduced, and accuracy of the flow measurement can be improved.

The vibration suppression member 11 which is in contact with the fluid passage 3 and the fastening member elastically damps a vibration transmitted to the fluid passage 3. The first protrusion 11a and the second protrusion 11b of the vibration suppression member 11 which are in contact with the fluid passage 3 are deformed so as to damp a vibration transmitted to the fluid passage 3. Thus, it becomes possible to suppress a situation in which a vibration generated in the ultrasonic transmission/reception unit 5, 6 is transmitted to the fluid passage 3, and prevent a noise generated by the vibration of the fluid passage 3 interferes with the ultrasonic pulse propagating. As a result, accuracy of the flow measurement can be improved.

Furthermore, the vibration suppression member 11 has a vibration suppressing function for suppressing (damping) a vibration in the piezoelectric substrate 17 or the like, and a vibration preventing function for preventing a vibration from propagating to the fluid passage 3 or the like. Thus, the vibration suppression member 11 having two functions is unitarily formed.

Since the vibration suppression member 11 is formed of the thermoplastic resin, it can be manufactured by injection molding in a short time. In addition, since the vibration suppression member 11 is unitarily formed on the surface of the metal plate 16 and the surface of the piezoelectric substrate 17, a work for mounting the vibration suppression member 11 is omitted. As a result, a high productivity of the ultrasonic transmission/reception unit 5, 6 can be attained.

Since the thermoplastic resin used for the vibration suppression member 11 is highly adhesive to the metal plate 16 and the piezoelectric substrate 17, the vibration suppression member 11 is able to exhibit a high vibration suppressing function. In addition, since the vibration of the metal plate 16 or the like is suppressed, an intensity level of a vibration transmitted from the metal plate 16 or the like to the fluid passage 3 can be lowered. Therefore, a reverberation vibration of the fluid passage 3 can be prevented, and high-accurate flow measurement can be implemented.

Since the metal plate 16 has a higher dimension accuracy than a resin plate, the ultrasonic transmission/reception unit 5, 6 can be mounted to the fluid passage 3 with a higher accuracy. Since this makes it possible to reduce a loss in transmission and reception of the ultrasonic pulse during the flow measurement, high-accurate flow measurement can be implemented.

Moreover, the gap 19 formed around the acoustic matching member 15 serves to prevent the insulative vibration suppression member 11 from adhering to the acoustic matching member 15. Because of this, it becomes possible to prevent a characteristic change of the acoustic matching member 15, which would be caused by the vibration suppression member 11. As a result, high-accurate flow measurement can be implemented.

Embodiment 2

In Embodiment 1, the acoustic matching member 15 and the piezoelectric substrate 17 are mounted to the metal plate 16 of a flat plate shape. By comparison, in Embodiment 2, the acoustic matching member 15 and the piezoelectric substrate 17 are mounted to a metal plate 31 of a flanged metal container shape.

(Manufacturing Method of Ultrasonic Transmission/Reception Unit)

Figure 5A:
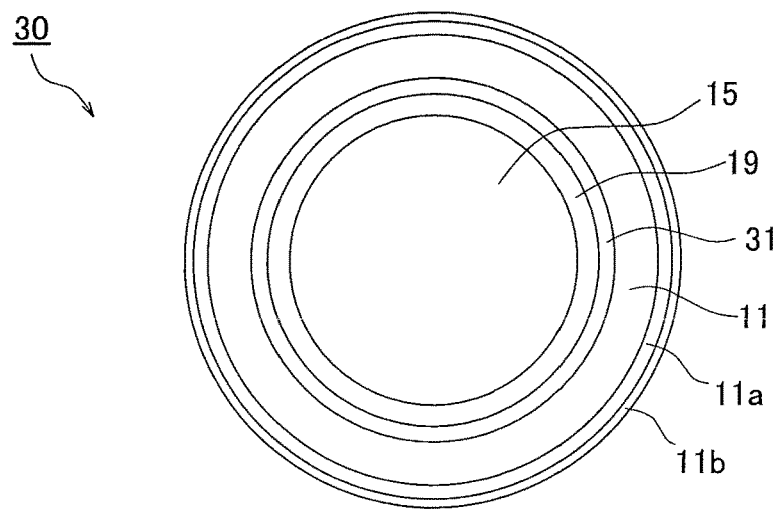
FIG. 5A is a plan view showing a front surface of an ultrasonic transmission/reception unit according to Embodiment 2 of the present invention.
Figure 5B:
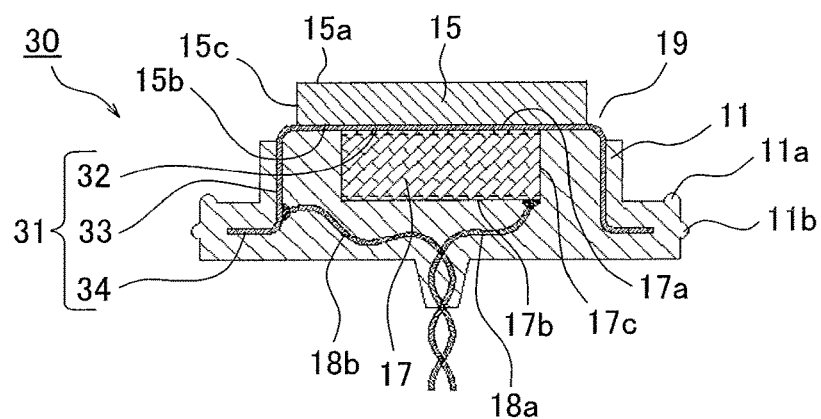
FIG. 5B is a cross-sectional view showing the ultrasonic transmission/reception unit of FIG. 5A.
Figure 5C:
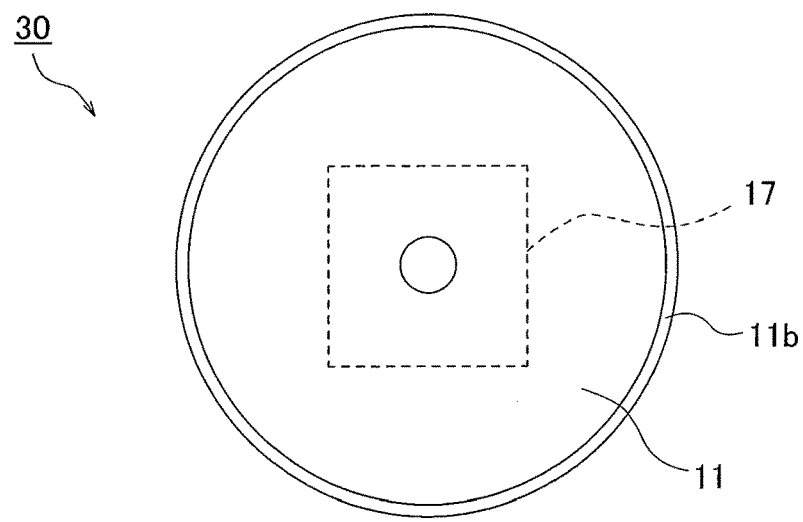
FIG. 5C is a plan view showing a rear surface of the ultrasonic transmission/reception unit of FIG. 5A.

FIG. 5A is a plan view showing a front surface of an ultrasonic transmission/reception unit 30 according to Embodiment 2. FIG. 5B is a cross-sectional view showing the ultrasonic transmission/reception unit 30. FIG. 5C is a plan view showing a rear surface of the ultrasonic transmission/reception unit 30.

The metal plate 31 has a flanged metal container shape, and includes a tubular peripheral wall portion 33, an end wall portion 32 closing one end of the peripheral wall portion 33, and a flange portion 34 formed at the other end of the peripheral wall portion 33. The wall end portion 32 has a disc shape and has an inner surface and an outer surface. The peripheral wall portion 33 has a cylindrical shape. One end of the peripheral wall portion 33 is connected to the end wall portion 32, while the other end thereof is connected to the flange portion 34. The flange portion 34 extends radially outward from the peripheral wall portion 33.

In the metal plate 31, the acoustic matching member 15 is fastened to the outer surface of the end wall portion 32 and the piezoelectric substrate 17 is fastened to the inner surface of the end wall portion 32. An inner diameter of the peripheral wall portion 33 is greater than a length of the piezoelectric substrate 17. Therefore, the piezoelectric substrate 17 is located in an inner space of the tubular peripheral wall portion 33, and there is formed a gap between piezoelectric substrate 17 and an inner surface of the peripheral wall portion 33.

The metal plate 31 is formed by deep drawing process of an electrically-conductive material, for example, metal such as iron, stainless, brass, copper, aluminum, or nickel-plated steel plate. The inner surface of the end wall portion 32 of the metal plate 31 is connected to the electrode of the piezoelectric substrate 17 by ohmic contact using an electrically-conductive material. The inner surface of the peripheral wall portion 33 of the metal plate 31 is connected to the second lead wire 18*b* by an electrically-conductive material such as solder. Because of this, the metal plate 31 having an electric conductivity electrically connects the electrode of the piezoelectric substrate 17 to the second lead wire 18*b*.

The vibration suppression member 11 is filled into the inner space of the tubular peripheral wall portion 33 such that it covers the surface of the piezoelectric substrate 17, the first lead wire 18*a* and the second lead wire 18*b*, and covers an inner surface of the flange portion 34, an outer peripheral surface of the flange portion 34, and an outer surface of the flange portion 34. The vibration suppression member 11 surrounds an outer peripheral surface 15*c* of the acoustic matching member 15 such that the gap 19 of a predetermined width exists between them.

(Manufacturing Method of Ultrasonic Transmission/Reception Unit)

Figure 6A:
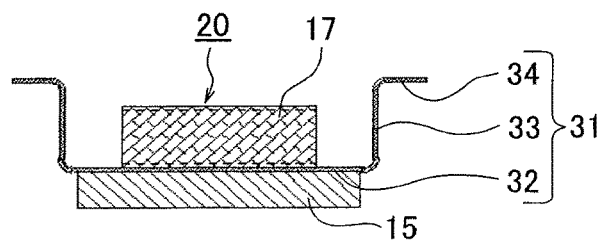
FIG. 6A is a cross-sectional view showing an assembly structure in which an acoustic matching member and a piezoelectric substrate are fastened to a metal plate in the ultrasonic transmission/reception unit of FIG. 5B.
Figure 6B:
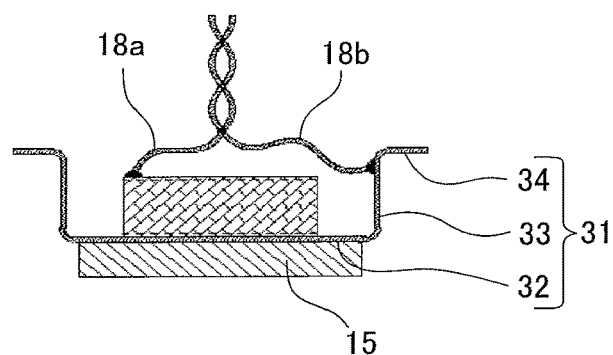
FIG. 6B is a cross-sectional view showing a state in which lead wires are connected to the assembly structure of FIG. 6A.
Figure 6C:
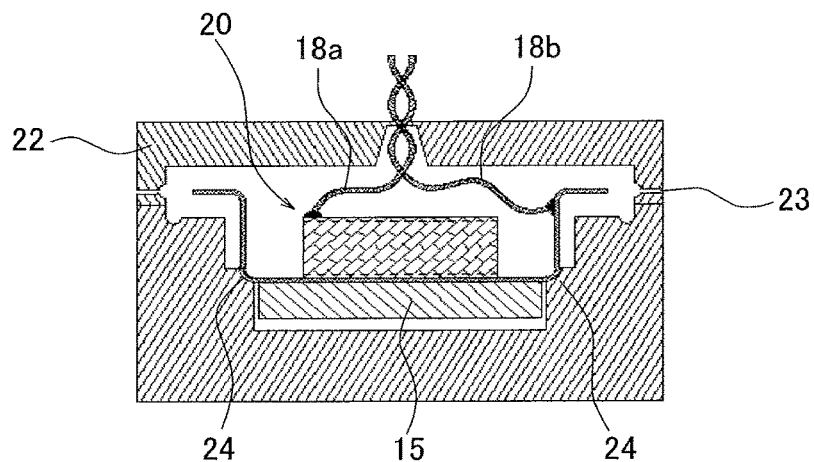
FIG. 6C is a cross-sectional view showing a state in which the assembly structure of FIG. 6B is accommodated into a die.
Figure 6D:
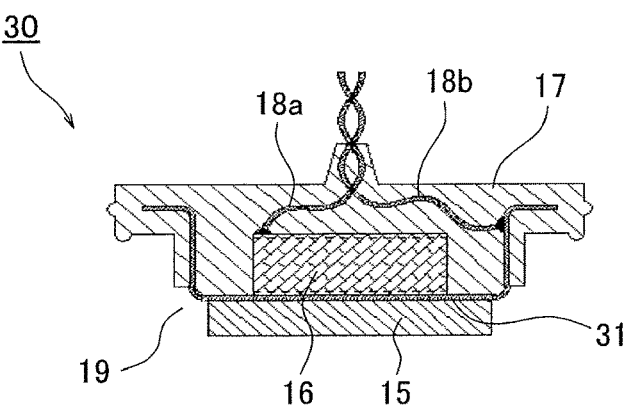
FIG. 6D is a cross-sectional view showing a state in which a vibration suppression member is mounted to the assembly structure of FIG. 6C.

FIG. 6A is a cross-sectional view showing the assembly structure 20 in which the acoustic matching member 15 and the piezoelectric substrate 17 are fastened to the metal plate 31. FIG. 6B is a cross-sectional view showing a state in which the lead wires are connected to the assembly structure 20. FIG. 6C is a cross-sectional view showing a state in which the assembly structure 20 is accommodated into the die 22. FIG. 6D is a cross-sectional view showing a state in which the vibration suppression member 11 is mounted to the assembly structure 20.

The manufacturing method of the ultrasonic transmission/reception unit 30 according to Embodiment 2 shown in FIGS. 6A to 6D is substantially the same as the manufacturing method of the ultrasonic transmission/reception unit 30 according to Embodiment 1 shown in FIGS. 2A to 2D, except that the shape of the die 22 of FIG. 6C is different from the shape of the die 22 of FIG. 2C.

As shown in FIG. 6C, an interior of the die 22 has a shape which is substantially similar to that of the assembly structure 20 connected with the lead wires 18*a*, 18*b* of FIG. 6B. It should be noted that the die 22 has the support portion 24 corresponding to the gap 19 of the vibration suppression member 11. The support portion 24 has a cylindrical shape and protrudes toward the interior of the die 22. A diameter of the inner surface of the support portion 24 is set slightly greater than a diameter of the acoustic matching member 15.

(Configuration of Ultrasonic Transmission/Reception Unit)

Figure 7:
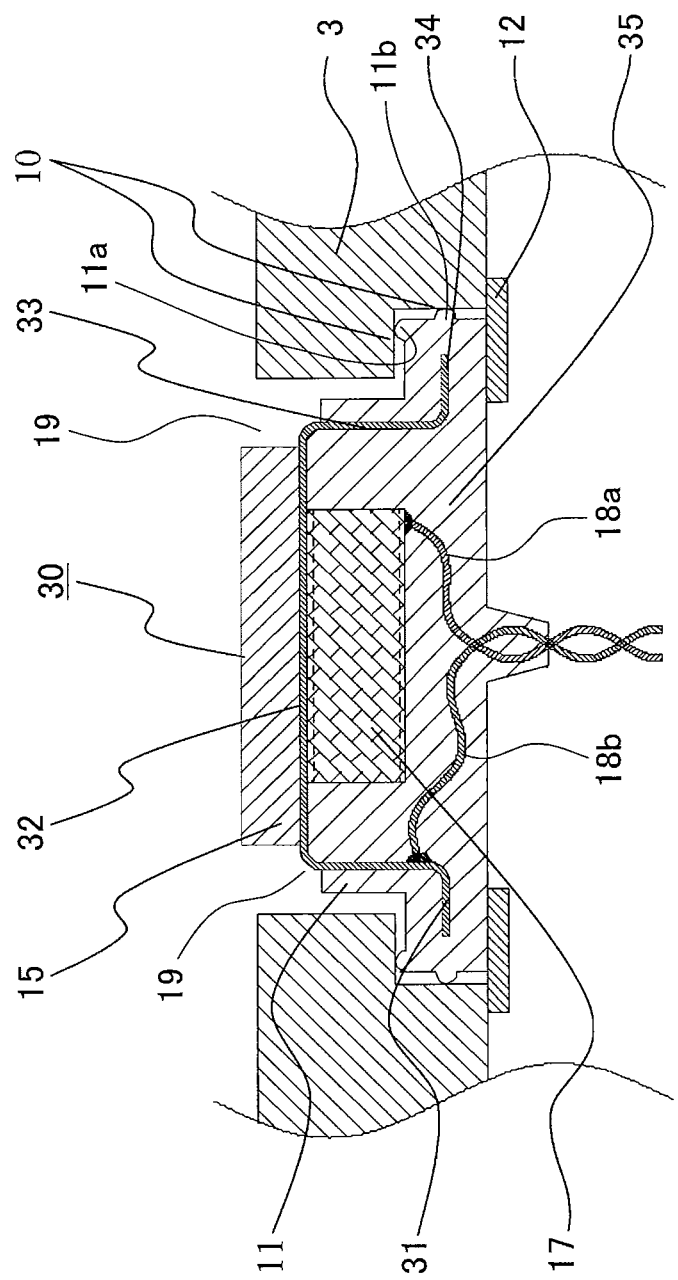
FIG. 7 is an enlarged cross-sectional view showing a portion of an ultrasonic flow meter device attached with the ultrasonic transmission/reception unit of FIG. 5B.

FIG. 7 is an enlarged cross-sectional view showing a portion of an ultrasonic flow meter device attached with the ultrasonic transmission/reception unit 30.

A configuration of the ultrasonic flow meter device according to Embodiment 2 of FIG. 7 is substantially the same as the configuration of the ultrasonic flow meter device according to Embodiment 1 of FIG. 4.

(Function, Advantage)

In accordance with the configuration as described above, the vibration suppression member 11 is filled into the inner space of the tubular peripheral wall portion 33 such that it covers the surface of the piezoelectric substrate 17, the first lead wire 18*a* and the second lead wire 18*b*, and covers the inner surface of the flange portion 34, the outer peripheral surface of the flange portion 34 and the outer surface of the flange portion 34. With this structure, the vibration suppression member 11 has a vibration suppressing function for suppressing (damping) a vibration in the piezoelectric substrate 17 or the like, and a vibration preventing function for preventing a vibration from propagating to the fluid passage 3 or the like. Because of this, accuracy of the flow measurement can be improved, and a high productivity can be attained, as in Embodiment 1.

Since the metal plate 31 of the flanged metal container shape has a higher dimension accuracy than a resin plate, high-accurate flow measurement can be implemented.

In addition, the gap 19 formed around the acoustic matching member 15 makes it possible to implement high-accurate flow measurement.

Furthermore, in addition to the vibration suppression member 11, the peripheral wall portion 33 of the metal plate 31 intervenes between the fluid passage 3 and the piezoelectric substrate 17 so as to damp a vibration in the piezoelectric substrate 17 or the like. A bent portion from the end wall portion 32 of the metal plate 31 to the peripheral wall portion 33 of the metal plate 31 makes it possible to reduce an undesired vibration of the end wall portion 32 after the ultrasonic pulse is generated. Because of these, it becomes possible to suppress a vibration from being transmitted from the ultrasonic transmission/reception unit 30 to the fluid passage 3 after the ultrasonic pulse is generated. As a result, accuracy of the flow measurement can be improved.

Embodiment 3

An ultrasonic transmission/reception unit 35 according to Embodiment 3 is configured such that the piezoelectric substrate 17 of the ultrasonic transmission/reception unit 30 of Embodiment 2 is provided with grooves 36.

Figure 8:
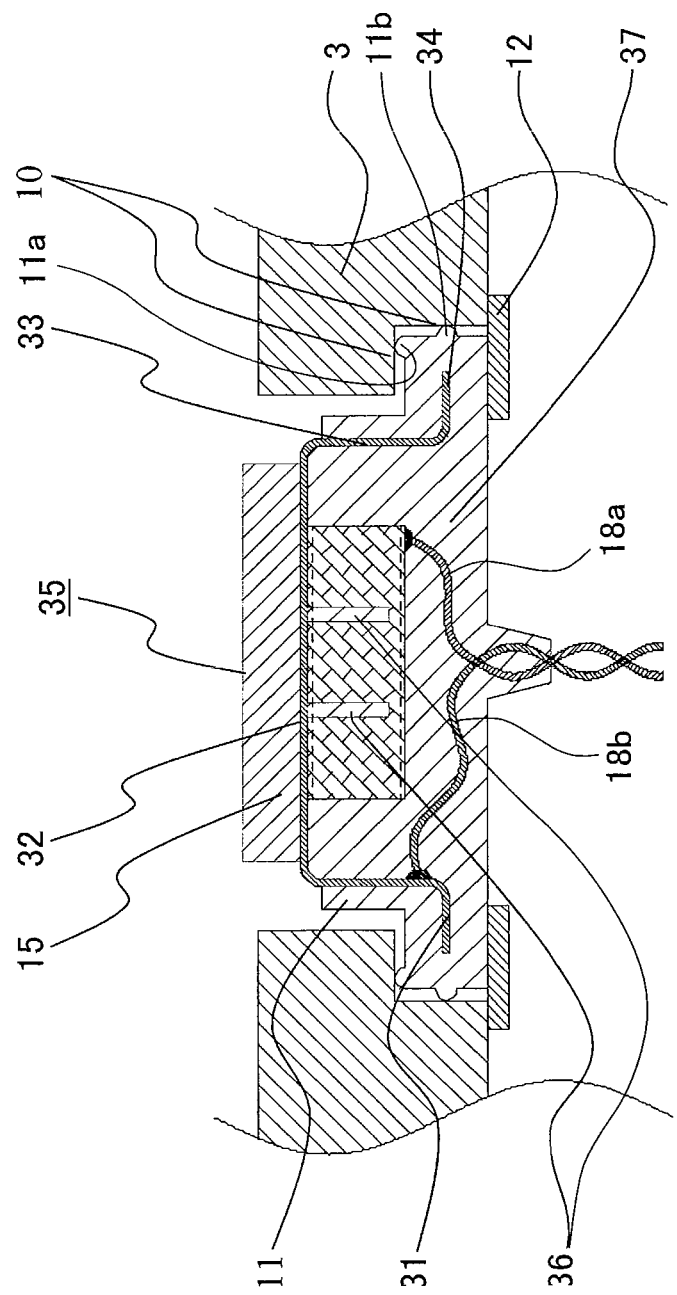
FIG. 8 is an enlarged cross-sectional view showing a portion of an ultrasonic flow meter device attached with an ultrasonic transmission/reception unit according to Embodiment 3 of the present invention.

FIG. 8 is an enlarged cross-sectional view showing a portion of the ultrasonic transmission/reception unit 35 attached to the ultrasonic flow meter device according to Embodiment 3.

The piezoelectric substrate 17 is provided with the grooves 36 extending in a thick direction of a piezoelectric section 17*c*. The vibration suppression member 11 is filled into the grooves 36.

In accordance with the above configuration, the vibration suppression member 11 is filled into the grooves 36 extending in a thickness direction of the piezoelectric section 17*c*. This makes it possible to suppress a vibration generated in the piezoelectric substrate 17 in a direction perpendicular to the thickness direction of the piezoelectric section 17*c*. Therefore, a vibration toward the fluid passage 3 can be suppressed, and a reverberation vibration in the fluid passage 3 can be reduced. Therefore, accuracy of the flow measurement can be further improved.

In Embodiment 3, the piezoelectric substrate 17 of the ultrasonic transmission/reception unit 30 including the metal plate 31, according to Embodiment 2, is provided with the grooves 36. Alternatively, the piezoelectric substrate 17 of the ultrasonic transmission/reception unit 5, 6 including the metal plate 16, according to Embodiment 1, may be provided with the grooves 36.

Embodiment 4

An ultrasonic transmission/reception unit 40 according to Embodiment 4 is configured such that the vibration suppression member 11 of the ultrasonic transmission/reception unit 5, 6 of Embodiment 1 is provided with a protruding portion 41.

Figure 9:
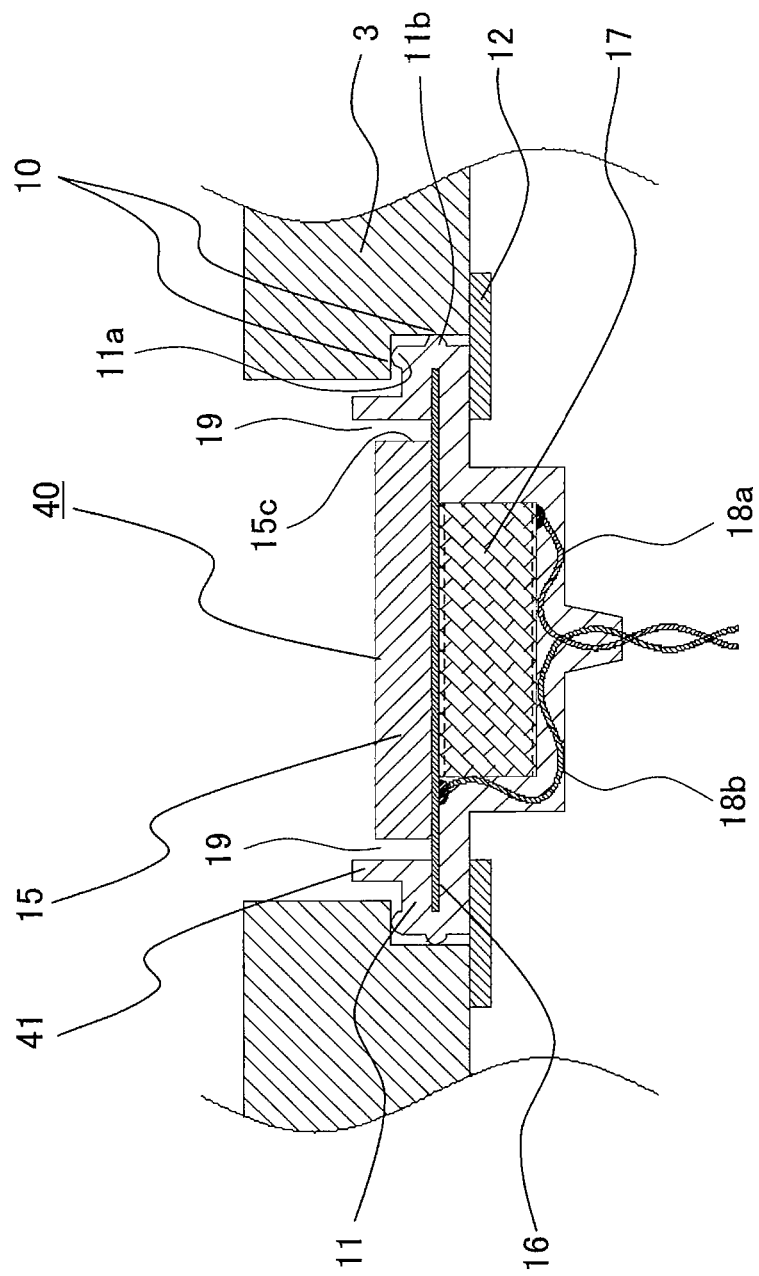
FIG. 9 is an enlarged cross-sectional view showing a portion of an ultrasonic flow meter device attached with an ultrasonic transmission/reception unit according to Embodiment 4 of the present invention.

FIG. 9 is an enlarged cross-sectional view showing a portion of the ultrasonic transmission/reception unit 40 attached to the ultrasonic flow meter device according to Embodiment 4.

The vibration suppression member 11 has the protruding portion 41 protruding in a thickness direction of the acoustic matching member 15. The protruding portion 41 has a cylindrical shape and has an inner diameter greater than a diameter of the acoustic matching member 15. Because of this, the protruding portion 41 surrounds the outer peripheral surface 15c of the acoustic matching member 15 with a gap between them. This gap forms the gap 19 of the vibration suppression member 11.

In accordance with this configuration, even when a stress or an impact is applied to the acoustic matching member 15, during assembling or the like, the vibration suppression member 11 protects the acoustic matching member 15. Because of this, the ultrasonic transmission/reception unit 40 can be easily assembled, and a high productivity of the ultrasonic transmission/reception unit can be attained.

In Embodiment 4, the vibration suppression member 11 of the ultrasonic transmission/reception unit 5, 6 including the metal plate 16, according to Embodiment 1, is provided with the protruding portion 41. Alternatively, the vibration suppression member 11 of the ultrasonic transmission/reception unit 30 including the metal plate 31, according to Embodiment 2, may be provided with the protruding portion 41.

Embodiment 5

An ultrasonic transmission/reception unit 50 according to Embodiment 5 is configured such that the piezoelectric substrate 17 of the ultrasonic transmission/reception unit 30 according to Embodiment 2 is provided with the grooves 36 of Embodiment 3, and the vibration suppression member 11 of the ultrasonic transmission/reception unit 30 according to Embodiment 2 is provided with the protruding portion 41 of Embodiment 4.

Figure 10:
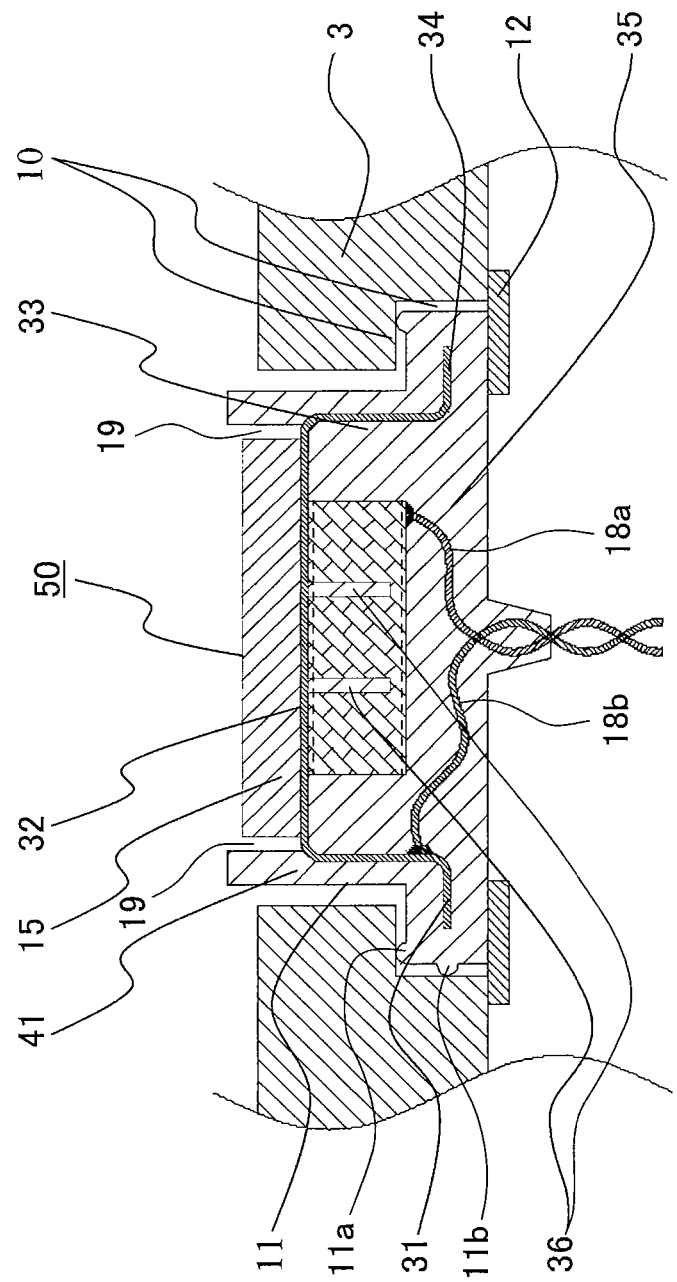
FIG. 10 is an enlarged cross-sectional view showing a portion of an ultrasonic flow meter device attached with an ultrasonic transmission/reception unit according to Embodiment 5 of the present invention.

FIG. 10 is an enlarged cross-sectional view showing a portion of an ultrasonic flow meter device attached with the ultrasonic transmission/reception unit 50 according to Embodiment 5.

In Embodiment 5, the piezoelectric substrate 17 of the ultrasonic transmission/reception unit 30 including the metal plate 31, according to Embodiment 2, is provided with the grooves 36, and the vibration suppression member 11 of the ultrasonic transmission/reception unit 30 including the metal plate 31, according to Embodiment 2, is provided with the protruding portion 41. Alternatively, the piezoelectric substrate 17 of the ultrasonic transmission/reception unit 5, 6 including the metal plate 16, according to Embodiment 1, may be provided with the grooves 36, and the vibration suppression member 11 of the ultrasonic transmission/reception unit 5, 6 including the metal plate 16, according to Embodiment 1, may be provided with the protruding portion 41.

Embodiment 6

An ultrasonic transmission/reception unit 60 according to Embodiment 6 is configured such that the vibration suppression member 11 of the ultrasonic transmission/reception unit 30 according to Embodiment 2 is provided with a through-hole 11c.

Figure 11:
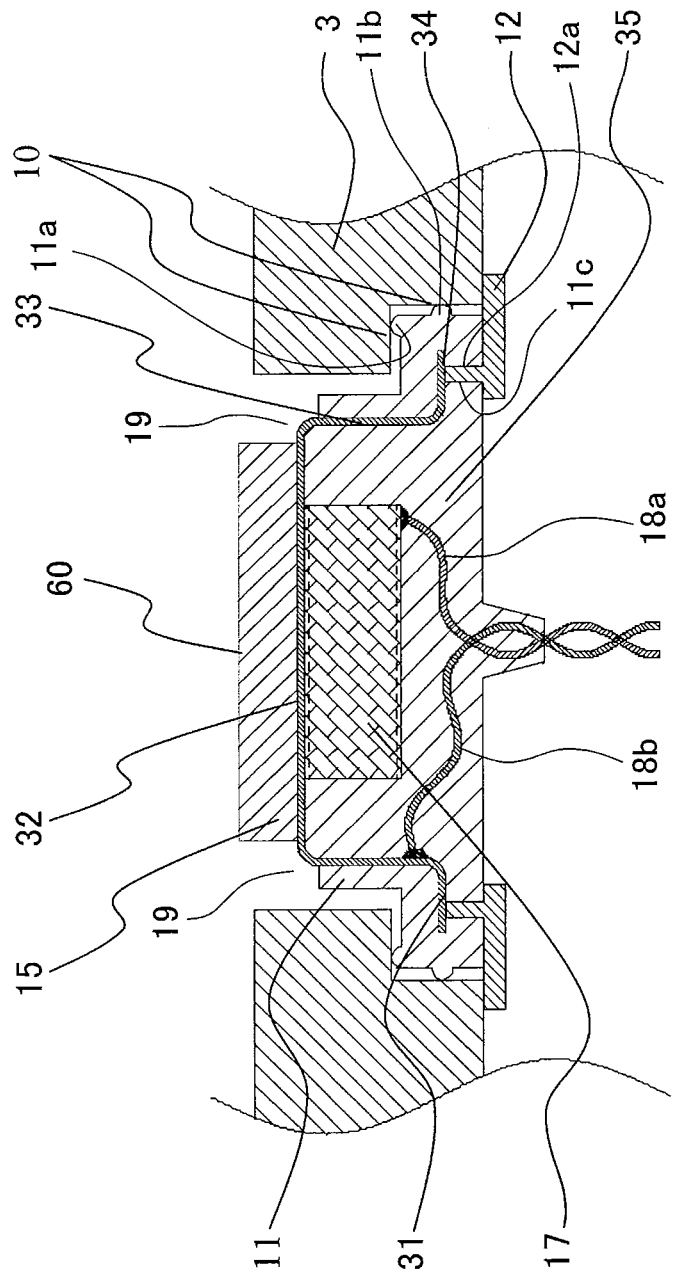
FIG. 11 is an enlarged cross-sectional view showing a portion of an ultrasonic flow meter device attached with an ultrasonic transmission/reception unit according to Embodiment 6 of the present invention.

FIG. 11 is an enlarged cross-sectional view showing a portion of an ultrasonic flow meter device attached with the ultrasonic transmission/reception unit 60 according to Embodiment 6.

The through-hole 11c is provided in the vibration suppression member 11 in a position facing the flange portion 34 of the metal plate 31. The through-hole 11c penetrates the vibration suppression member 11 to the flange portion 34. The flange portion 34 is exposed to outside through the through-hole 11c. The through-hole 11c is positioned so as to correspond to a protrusion 12a of the fastening member 12. Because of this, when the ultrasonic transmission/reception unit 60 is attached to the fluid passage 3, the protrusion 12a is inserted through the through-hole 11c and contacts the flange portion 34. This causes the metal plate 31 to be pressed against the fluid passage 3, and the ultrasonic transmission/reception unit 60 to be mounted to a specified position of the fluid passage 3. Therefore, the ultrasonic transmission/reception unit 60 can transmit and receive the ultrasonic pulse with a higher accuracy, and as a result, accuracy of the flow measurement is improved.

In Embodiment 6, the vibration suppression member 11 of the ultrasonic transmission/reception unit 30 of Embodiment 2 is provided with the through-hole 11c. Alternatively, the vibration suppression member 11 of the ultrasonic transmission/reception unit of Embodiments 1, 3 to 5 may be provided with the through-hole 11c.

Embodiment 7

In the above described embodiments, the second lead wire 18b is connected to the electrode 17a of the piezoelectric substrate 17 via the metal plate 16, 31. Alternatively, the second lead wire 18b may be directly connected to the electrode 17a of the piezoelectric substrate 17.

Embodiment 8

In the above described embodiments, the electrode 17a of the piezoelectric substrate 17 is provided separately from the metal plate 16, 31. Alternatively, the metal plate 16, 17 may serve as the electrode 17a of the piezoelectric substrate 17.

The above described embodiments may be combined so long as they do not rule out each other.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

An ultrasonic transmission/reception unit, a manufacturing method of the ultrasonic transmission/reception unit, and an ultrasonic flow meter device including the ultrasonic transmission/reception unit of the present invention are useful as an ultrasonic transmission/reception unit, a manufacturing method of the ultrasonic transmission/reception unit, an ultrasonic flow meter device including the ultrasonic transmission/reception unit, etc., which enable a higher productivity and flow measurement with a higher accuracy in a measurement device attached with the ultrasonic transmission/reception unit, than a prior art example.

The invention claimed is:
1. An ultrasonic transmission/reception unit comprising:
a metal plate;
an acoustic matching member fastened to a first main surface of the metal plate;

a piezoelectric substrate fastened to a second main surface of the metal plate such that the piezoelectric substrate corresponds to a portion of the metal plate to which the acoustic matching member is fastened;
a first lead wire connected to an end portion of the piezoelectric substrate which is more distant from the metal plate, to supply a voltage applied to the piezoelectric substrate;
a second lead wire connected to the metal plate, to supply the voltage applied to the piezoelectric substrate; and
a vibration suppression member containing a thermoplastic resin as a major component, the vibration suppression member being configured to cover, in a unitary manner, the second main surface of the metal plate, except for a portion of the second main surface to which the piezoelectric substrate is fastened, a surface of the piezoelectric substrate, an end surface of the metal plate, an outer peripheral portion of the first main surface of the metal plate, the first lead wire, and the second lead wire
wherein the vibration suppression member contacts no portion of the acoustic matching member directly;
wherein the metal plate has a flat plate shape and houses no piezoelectric substrate.

2. The ultrasonic transmission/reception unit according to claim 1,
wherein the metal plate has a flanged metal container shape, including a tubular peripheral portion, an end wall portion closing one end of the peripheral portion, and a flange portion formed at the other end of the peripheral wall portion;
wherein the acoustic matching member is fastened to an outer surface of the end wall portion;
wherein the piezoelectric substrate is fastened to an inner surface of the end wall portion such that the piezoelectric substrate is located in an inner space of the tubular peripheral wall portion;
wherein the second lead wire is connected to the metal plate; and
wherein the vibration suppression member is filled in the inner space of the tubular peripheral portion such that the vibration suppression member covers the surface of the piezoelectric substrate, the first lead wire and the second lead wire, and has a unitary structure to cover an inner surface of the flange portion, an outer peripheral surface of the flange portion, an outer surface of the flange portion, and an outer surface of the peripheral wall portion.

3. The ultrasonic transmission/reception unit according to claim 1, wherein the piezoelectric substrate has a groove extending in a thickness direction of the metal plate, and the vibration suppression member is filled into the groove.

4. The ultrasonic transmission/reception unit according to claim 1, wherein the vibration suppression member has a protruding portion protruding in a direction from a base end of the acoustic matching member toward a tip end of the acoustic matching member, in a portion covering the first main surface of the metal plate.

5. The ultrasonic transmission/reception unit according to claim 1, wherein the vibration suppression member has a gap between the vibration suppression member and an outer peripheral surface of the acoustic matching member.

6. A method of manufacturing an ultrasonic transmission/reception unit, comprising the steps of:

creating an assembly structure including
a metal plate,
an acoustic matching member fastened to a first main surface of the metal plate,
a piezoelectric substrate fastened to a second main surface of the metal plate such that the piezoelectric substrate corresponds to a portion of the metal plate to which the acoustic matching member is fastened,
a first lead wire connected to an end portion of the piezoelectric substrate which is more distant from the metal plate, to supply a voltage applied to the piezoelectric substrate, and
a second lead wire connected to the metal plate, to supply the voltage applied to the piezoelectric substrate; and
after accommodating the assembly structure into a die, forming a vibration suppression member which is made of a thermoplastic resin and is a single member made of a continuous material, by injecting the thermoplastic resin into the die such that the vibration suppression member covers, in a unitary manner, the second main surface of the metal plate, except for a portion of the second main surface to which the piezoelectric substrate is fastened, a surface of the piezoelectric substrate, an end surface of the metal plate, an outer peripheral portion of the first main surface of the metal plate, the first lead wire, and the second lead wire and such that the vibration suppression member contacts no portion of the acoustic matching member directly;
wherein the metal plate has a flat plate shape and houses no piezoelectric substrate.

7. The method of manufacturing the ultrasonic transmission/reception unit according to claim 6,
wherein in the step of forming the vibration suppression member, the assembly structure is accommodated into an inner space of the die such that the first main surface of the metal plate faces downward and a portion of the first main surface which is around the acoustic matching member is supported by an annular support portion of the die; and
wherein the vibration suppression member is formed with a gap between the vibration suppression member and an outer peripheral surface of the acoustic matching member by injecting the thermoplastic resin into a region in the inner space of the die, which region is located outward relative to the annular support portion.

8. An ultrasonic flow meter device comprising:
a pair of ultrasonic transmission/reception units each of which is recited in claim 1, the pair of ultrasonic transmission/reception units being configured to mutually transmit and receive an ultrasonic pulse;
a fluid passage to which the pair of ultrasonic transmission/reception units are attached such that the pair of ultrasonic transmission/reception units are apart from each other;
a propagation time measuring section for measuring time for which the ultrasonic pulse propagates between the pair of ultrasonic transmission/reception units; and
a calculating section for calculating a flow of a measurement target fluid based on the time measured by the propagation time measuring section.

* * * * *